United States Patent [19]
Ashton

[11] Patent Number: 4,847,802
[45] Date of Patent: Jul. 11, 1989

[54] METHOD AND APPARATUS FOR IDENTIFYING THE PRECISION OF AN OPERAND IN A MULTIPRECISION FLOATING-POINT PROCESSOR

[75] Inventor: Charles D. Ashton, Campbell, Calif.

[73] Assignee: Advanced Micro Devices, Inc., Sunnyvale, Calif.

[21] Appl. No.: 873,667

[22] Filed: Jun. 12, 1986

[51] Int. Cl.⁴ .............................................. G06F 7/38
[52] U.S. Cl. .................................... 364/748; 364/745
[58] Field of Search ...................... 364/748, 745, 736.5

[56] References Cited

U.S. PATENT DOCUMENTS

| | | | |
|---|---|---|---|
| 3,742,198 | 6/1973 | Morris | 364/748 |
| 3,930,232 | 12/1975 | Wallach et al. | 364/200 |
| 4,258,429 | 3/1981 | Raymond, Jr. | 364/736 |
| 4,338,675 | 7/1982 | Palmer et al. | 364/737 |
| 4,449,196 | 5/1984 | Pritchard | 364/745 |
| 4,603,323 | 7/1986 | Hassitt et al. | 364/748 |

FOREIGN PATENT DOCUMENTS

85/03148  7/1985  PCT Int'l Appl. ................ 364/748

OTHER PUBLICATIONS

*Introducing the SP50 Family*, Philips Electronics, Jan. 1986.
*Fujitsu General Purpose Digital Signal Processor MB8764*, Fujitsu, Dec. 1985, Santa Clara, Calif.
μPD7281 *Image Pipelined Processor*, NEC Electronics pp. 1-12, May 1985 Mountain View, Calif.

*Primary Examiner*—Gary V. Harkcom
*Assistant Examiner*—Dale M. Shaw
*Attorney, Agent, or Firm*—Fliesler, Dubb, Meyer & Lovejoy

[57] ABSTRACT

An arithmetic logic unit (ALU) and a plurality of operand registers wherein each of the operand registers includes a tag cell for storing a bit identifying the precision of the operand stored therewith. In operation operands are transferred to and from the ALU together with their precision tag to facilitate processing of the operands in the ALU without the need for special software to keep track of the precision of the individual operands.

4 Claims, 1 Drawing Sheet

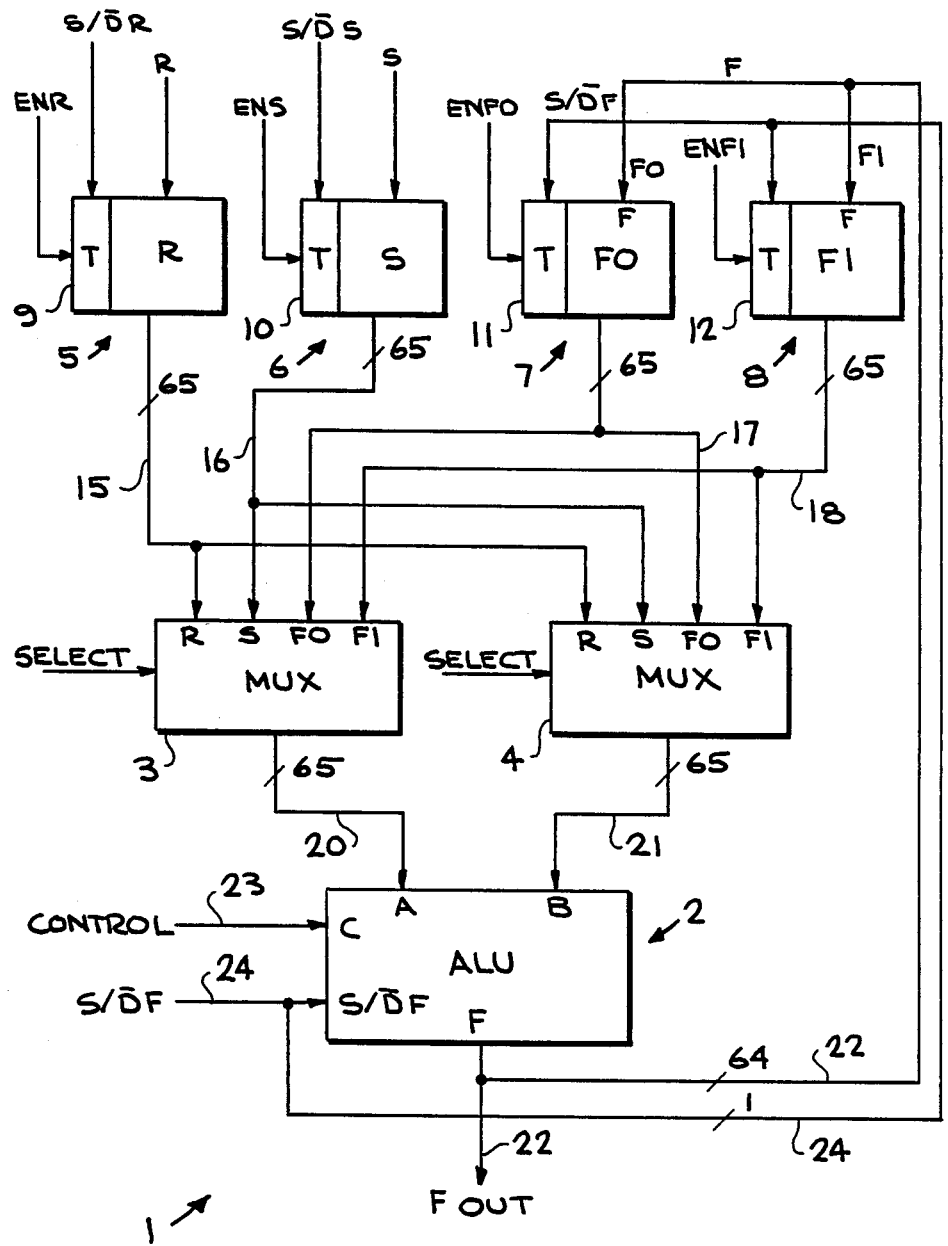

METHOD AND APPARATUS FOR IDENTIFYING THE PRECISION OF AN OPERAND IN A MULTIPRECISION FLOATING-POINT PROCESSOR

BACKGROUND OF THE INVENTION

1. Field of the Invention

The present invention relates to multiprecision floating-point processors in general and in particular to a method and apparatus for identifying the precision of input and output operands in a multiprecision floating-point processor using an identifying precision tag with each operand.

2. Description of Prior Art

A number of floating-point formats are currently used in floating-point processors, such as for example, IEEE, DEC D, DEC G AND IBM.

In each of the above-identified formats, an operand can be represented with a selected degree of precision, e.g. single or double precision. For example, in the IEEE floating-point format, a single precision operand comprises 32 bits among which, one bit comprises a sign bit, 8 bits comprise an exponent and 23 bits comprise a fraction. The same operand represented with double precision comprises 64 bits among which, one bit comprises a sign bit, 11 bits comprise an exponent and 52 bits comprise a fraction.

Regardless of the format used, the precision of each of the input and output operands in a particular arithmetic operation usually depends on the nature of the operation and the resolution and accuracy desired. For example, in forming a sum of a plurality of products having the form $a_1b_1 + a_2b_2 \ldots a_nb_n$, both single precision and double precision operands are usually involved. In such operations, the input operands which correspond to the individual multiplicands and multipliers are often provided as single precision operands, while the output operand corresponding to the product of the multiplication is often provided for purposes of accuracy and resolution as a double precision operand. Therefore, when obtaining the sum of a plurality of products, the ALU used must be selectively controllable to operate on two single precision input operands to produce a double precision output operand when forming the products and thereafter controllable to operate on two double precision operands when forming the sum of the products.

In other arithmetic operations it may be necessary for the ALU to operate on mixed precision operands simultaneously. For example, in certain cases, one of two input operands may be a single precision operand and the other a double precision operand with the output operand being either a single or a double precision operand. In such cases, the ALU must be responsive to a control signal corresponding to the precision of the individual operands.

Since the requirements of various arithmetic operations may comprise both single and double precision input and output operands as well as mixed precision operands, the ALU used should be capable of handling mixed precision operands in general. Fortunately, ALU's which are capable of handling mixed precision operands are known. For example, the Intel 8087 is such an ALU.

In operation, an instruction word for the Intel 8087 specifies the precisions of the input operands and the output operand in addition to the operation to be executed.

While mixed precision arithmetic operations are possible using prior known methods and apparatus as described above, a serious disadvantage of the prior known methods and apparatus is that, heretofore, it has been necessary to keep track of the precision of each operand and to generate instruction words containing the necessary precision information in a timely manner off-chip using software specially designed therefor. These requirements have typically placed a heavy burden on the software programmer and have necessitated additional off-chip storage to facilitate keeping track of the precision of each operand and the generation of the necessary instruction words.

SUMMARY OF THE INVENTION

In view of the foregoing, principle objects of the present invention are a method and apparatus for identifying the precision of each operand processed by a floating-point processor capable of processing multiprecision floating-point operands using a tag bit stored and transferred with each operand in the processor.

In accordance with the above objects there is provided on a single chip a mulitiprecision floating-point ALU, a plurality of operand storage registers, means for storing a plurality of tag bits and a multiplexer circuit. The operand registers are provided for storing input operands received from an off-chip source of operands and for temporarily storing on-chip an output operand received from the ALU comprising the results of previous ALU operations. The tag bit storing means is provided for storing tag bits which identify the precision of each operand. The multiplexer circuit is provided for transferring the contents of selected ones of the operand storage registers and tag bit storing means to selected inputs of the ALU.

In the ALU there is provided a plurality of precision control signal inputs which are adapted to respond to the precision tag bits stored in the on-chip tag bit storage means and a precision control signal input which is adapted to respond to a tag bit for selectively causing the ALU to output a single or double precision operand.

In an embodiment of the invention, the identifying tag is a logical 0 if the operand stored therewith is a double precision operand and a logical 1 if the operand stored therewith is a single precision operand, or vice versa.

In operation, operands are transferred to the operand storage registers together with a tag bit identifying their precision. From the operand storage registers, the operands are transferred to the ALU with their precision tags. In the ALU, the tags are recognized automatically and used for controlling the operation of the ALU.

In response to the output operand precision control signal, the ALU provides an output operand having a predetermined precision with a corresponding precision tag bit. The output operand is thereafter transferred together with its precision tag bit to the on-chip operand storage registers for subsequent processing in the ALU.

Because the operands are transferred to and from the ALU in conjunction with their precision tag bits, special programming and off-chip storage to keep track of the precision of each operand and to generate precision control signals for the operands sent to the ALU are not required. This greatly simplifies multiprecision operand and mixed precision operand ALU operations.

BRIEF DESCRIPTION OF THE DRAWING

The above and other objects features and advantages of the present invention will become apparent from the following detailed description of the accompanying drawing in which there is provided a block diagram of a multiprecision floating-point processor according to the present invention.

DETAILED DESCRIPTION OF THE DRAWING

Referring to the drawing there is provided in accordance with the present invention a multiprecision floating-point processor designated generally as 1. In the processor 1 there is provided a multiprecision floating-point arithmetic logic unit (ALU) 2, a pair of four input multiplexer circuits 3 and 4, a plurality of 64-bit operand registers 5 and 6 and a plurality of 64-bit operand registers 7 and 8.

Located in each of the registers 5–8 or used in conjunction therewith there is provided a one-bit precision tag bit storage cell 9, 10, 11 and 12, respectively. The storage cells 9–12 are provided for storing a tag bit identifying the precision of a floating-point operand stored in the register associated therewith. In the register 5 there is provided a 64-line operand input bus designated R. In the register 6 there is provided a 64-line operand input bus designated S. In the register 7 there is provided a 64-line operand input bus designated F0. In the register 8 there is provided a 64-line operand input bus designated F1. Coupled to the tag cell 9 there is provided a precision tag bit input line designated $S/\overline{D}$ R. Coupled to the tag cell 10 there is provided a precision tag bit input line designated $S/\overline{D}$ S. Coupled to the tag cells 11 and 12 there is provided a precision tag bit input line designated $S/\overline{D}$ F. Coupled to the register 5 and tag cell 9 there is provided an enable control signal input line ENR. Coupled to the register 6 and the tag cell 10 there is provided an enable input control signal line ENS. Coupled to the register 7 and the tag cell 11 there is provided an enable control signal line ENF0. Coupled to the register 8 and the tag cell 12 there is provided an enable control signal line ENF1.

In each of the multiplexers 3 and 4 there is provided four input ports designated R, S, F0 and F1, respectively, a select control signal input port coupled to a control signal line designated SELECT and an output port.

To couple the register 5 and tag cell 9 to the first input port R of the multiplexers 3 and 4 there is provided a 65-bit data bus 15. To couple the register 6 and tag cell 10 to a second port S of the multiplexers 3 and 4 there is provided a 65-bit data bus 16. To couple the register 7 and the bit cell 11 to the third port F0 of the multiplexers 3 and 4 there is provided a 65-bit data bus 17. To couple the register 8 and the tag cell 12 to the fourth port F1 of the multiplexers 3 and 4 there is provided a 65-bit data bus 18. In each of the above-described 65-bit data buses 15–18, 64 lines are provided for the 64-bit operands R, S, F0 and F1 and one of the lines is provided for the precision tags $S/\overline{D}$ R, $S/\overline{D}$ S, $S/\overline{D}$ F.

In the ALU 2 there is provided a pair of input ports A and B coupled to the outputs of the multiplexers 3 and 4 by means of a pair of 65-bit buses 20 and 21, an output port F coupled to a 64-bit output signal bus 22, a control signal input port C coupled to a bus 23 and a precision control signal input port $S/\overline{D}$ F coupled to a control signal line 24. The bus 22 is provided for coupling the output of the ALU to the F0 and F1 registers 7 and 8 and for transmitting data off-chip. The control signal bus 23 is provided for selecting the logic and arithmetic operations to be performed by the ALU 2. The control signal line 24 is provided for setting the precision of the output operand and the tag bit cells 11 and 12.

In addition to the control signal input C and the data output F there is also provided in the ALU 2 conventional means (not shown) for processing multiprecision floating-point operands as will be further described below. A specific embodiment of an ALU which has the capability of processing multiprocessing floating-point operands and which may be used in the apparatus of the present invention is the Intel 8087 in which the precision control signal input lines have been adapted to receive the precision tag bits on the lines 15–18 and a precision control signal tag on the line 24.

In operation, operands are loaded from a conventional off-chip source into the R and S registers 5 and 6 and tag bits indicative of the precision of the operands stored in R and S registers 5 and 6 are stored in the tag cells 9 and 10, respectively, under the control of enable signals ENR and ENS, respectively. For example, if single precision operands are stored in the R and S registers 5 and 6, a logical 1 is stored in the tag cells 9 and 10 by means of the tag cell input lines $S/\overline{D}$ R and $S/\overline{D}$ S, respectively. On the other hand if the operands stored in the R and S registers 5 and 6 are double precision opeands, the tag bits stored in the tag cells 9 and 10 comprise a logical 0. Moreover, if the operands stored in R and S registers 5 and 6 are mixed precision operands, the tag bits stored in cells 9 and 10 have values corresponding thereto.

After the operands are stored in the R and S registers 5 and 6, they are transferred to the ALU 2 via the multiplexers 3 and 4 under the control of select control signal on the control signal bus SELECT. In the ALU 2, the operands are processed in accordance with control signals applied to the control signal bus 23. The precision of the output operand which results from the processing of the input operands from the R and S registers 5 and 6 is determined by the value of the precision tag bit applied to the tag bit signal line 24. If the tag bit applied to the control signal bit line 24 is a logical 1 the output operand is provided as a single precision operand. On the other hand, if the tag bit applied to the control signal bit line 24 is a logical 0, the output operand provided by the ALU 2 is a double precision operand. In either case, the output operand is provided on the output data bus $F_{OUT}$ and is transferred off-chip and/or to either or both of the F0 and F1 registers 7 and 8 together with the tag bit $S/\overline{D}$ F under the control of the enable signals applied to the enable signal input lines ENF0 and ENF1 coupled to the registers 7 and 8 and the tag cells 11 and 12, respectively.

By transferring operands to and from the ALU 2 with a tag bit identifying their precision it will be appreciated that mixed precision operands can be processed in the ALU without the necessity for providing software to keep track of the precision of the operands processed in the ALU.

While a preferred embodiment of the present invention is described above it is contemplated that various modifications may be made thereto without departing from the spirit and scope of the present invention. For example, while the tag cells 9, 10 11 and 12 are described as comprising an integral part of the registers 5-8 it will be appreciated that the tag cells 9-12 may comprise separate storage registers which are controlled by the same enable signals which control the loading of the registers 5-8. It is also contemplated that while the tag cells 9-12 are described as single bit tag cells, they may also comprise cells capable of storing a plurality of bits so that more than two levels of precision may be selected. Additionally, it is contemplated that three port or larger ALU's may be used in various embodiments of the present invention. Accordingly, it is intended that the embodiment described above be considered only as illustrative of the present invention and that the scope of the invention be determined by reference to the claims hereinafter provided.

What is claimed is:

1. A method of identifying the precision of and processing of operands in a multiprecision floating-point processor comprising on a single chip an ALU and a plurality of registers for storing a plurality of said operands, each of said operands having a tag comprising one or more tag bits for identifying the precision of the operand, comprising the steps of:

providing a first and a second one of said operands;

providing a first and a second one of said tags which identify the precision of said first and said second operands, respectively;

transferring said first and said second operands and said first and said second tags to a first and a second one of said plurality of registers, respectively;

transferring said first and said second operands and said first and said second tags simultaneously from said first and said second registers to said ALU;

providing a third tag;

transferring said third tag to said ALU;

processing said first and said second operands in said ALU under the control of said first, said second and said third tags for providing a third operand having a precision identified by said third tag; and transferring said third operand and said third tag from and to said ALU for further processing of said third operand.

2. A method according to claim 1 wherein said steps of transferring said third operand and said third tag from and to said ALU comprises the steps of:

transferring said third operand and said third tag from said ALU to a third one of said plurality of registers; and transferring said third operand and said third tag from said third register to said ALU for processing said third operand and said third tag with another operand and tag from another one of said plurality of registers.

3. An apparatus for identifying the precision of and processing of operands in a multiprecision floating-point processor comprising:

an ALU;

a plurality of registers for storing a plurality of said operands, each of said operands having a tag comprising one or more tag bits for identifying the precision of the operand;

means for providing a first and a second one of said operands;

means for providing a first and a second one of said tags which identify the precision of said first and said second operands, respectively;

means for transferring said first and said second operands and said first and said second tags to a first and a second one of said registers, respectively;

means for transferring said first and said second operands and said first and said second tags simultaneously from said first and said second registers to said ALU;

means for providing a third one of said tags;

means for transferring said third tag to said ALU, said ALU including means for processing said first and said second operands in said ALU under the control of said first, said second and said third tags for providing a third operand having a precision identified by said third tag; and means for transferring said third operand and said third tag from said ALU for further processing of said third operand.

4. An apparatus according to claim 3 wherein said means for transferring said third operand and said third tag from and to said ALU comprises:

means for transferring said third operand and said third tag from said ALU to a third one of said plurality of registers; and means for transferring said third operand and said third tag from said third register to said ALU for processing said third operand and said third tag with another operand and tag from another one of said plurality of registers.

* * * * *